US00RE44805E

(19) United States
(12) Reissued Patent
Dahlo

(10) Patent Number: US RE44,805 E
(45) Date of Reissued Patent: Mar. 18, 2014

(54) ICE SKATE AND ICE SKATE BLADE THEREOF

(71) Applicant: Earl Arthur Dahlo, Coquitlam (CA)

(72) Inventor: Earl Arthur Dahlo, Coquitlam (CA)

(73) Assignee: Switchblade Sports (BC) Corp., Vancouver, CA (US)

(21) Appl. No.: 13/815,397

(22) Filed: Feb. 27, 2013

Related U.S. Patent Documents

Reissue of:
(64) Patent No.: 7,243,924
Issued: Jul. 17, 2007
Appl. No.: 11/212,467
Filed: May 5, 2005

(30) Foreign Application Priority Data

Nov. 12, 2004 (CA) ..... 2487626

(51) Int. Cl.
*A63C 1/30* (2006.01)
*A63C 1/00* (2006.01)

(52) U.S. Cl.
USPC ..... 280/11.18; 280/11.12; 280/841

(58) Field of Classification Search
USPC ..... 280/11.18, 11.12, 841
See application file for complete search history.

(56) References Cited

U.S. PATENT DOCUMENTS

| | | | | |
|---|---|---|---|---|
| 2,874,970 | A * | 2/1959 | Mall | 280/7.13 |
| 4,379,563 | A * | 4/1983 | Arsenault | 280/7.1 |
| 5,505,467 | A * | 4/1996 | Hill et al. | 280/11.16 |
| 5,727,796 | A * | 3/1998 | Zhang | 280/7.13 |
| 5,906,380 | A * | 5/1999 | Searby et al. | 280/7.13 |
| 5,988,683 | A * | 11/1999 | Venier et al. | 280/841 |
| 6,485,033 | B2 * | 11/2002 | Nicoletti et al. | 280/11.18 |
| 7,523,947 | B2 * | 4/2009 | Pham et al. | 280/11.12 |
| 7,950,676 | B2 * | 5/2011 | Goldsmith et al. | 280/11.12 |
| 8,047,552 | B2 * | 11/2011 | Julien | 280/11.18 |
| 8,297,627 | B2 * | 10/2012 | Smith, II | 280/11.18 |

* cited by examiner

*Primary Examiner* — J. Allen Shriver, II
*Assistant Examiner* — James M Dolak
(74) *Attorney, Agent, or Firm* — Smiths IP

(57) ABSTRACT

An ice skate comprising an ice skate blade holder and an ice skate blade secured in a longitudinal recess of the ice skate blade holder. The ice skate blade has an ice contacting lower and upper curvatures so as to be positionally changeable in one of two alternative working positions with respect to the ice skate blade holder, wherein the ice skate blade is attached. The ice skate blade has also substantially parallel, opposed side surfaces intersected by at least two longitudinally spaced apart apertures coinciding with at least two longitudinally spaced apart, transversal openings in the ice skate blade holder. Use is made of restraining means inserted through at least two longitudinally spaced apart apertures and at least two longitudinally spaced apart, transversal openings, so as secure together the ice skate blade holder and the ice skate blade.

4 Claims, 3 Drawing Sheets

ICE SKATE AND ICE SKATE BLADE THEREOF

Matter enclosed in heavy brackets [ ] appears in the original patent but forms no part of this reissue specification; matter printed in italics indicates the additions made by reissue.

I. BACKGROUND OF THE INVENTION

1. Field of the Invention

The present invention relates in general to ice skates and, more particularly, to an ice skate blade with an improved configuration.

2. Description of the Related Art

As it is known, an ice skate includes a skate boot, an ice skate blade holder supporting the skate boot and fastened thereto and an ice skate blade removably secured to the ice skate blade holder, or incorporated into the latter.

Many attempts have been made to extend the life of ice skate blades.

Generally, the ice skate blades are formed from hardened steel, such as high carbon steel and are able to withstand the forces encountered during various skating activities (speed skating, ice hockey, figure skating, etc.). Each of these activities may use slightly different ice skate blades that have been developed in response to users requirements.

Thus, ice skate blades must be able to withstand periodic contouring according to the requirements of each of the foregoing activities and preferences of each skater. In addition, ice skate blades require periodic sharpening (grinding) to maintain a sharp edge that provides an adequate gliding ability.

Both sharpening and contouring involve removing a portion of the material from which the ice skate blade is formed.

The amount of material removed may vary substantially, based on the condition of the ice skate blade and the force used during sharpening and/or contouring. Thus, ice skate blades eventually wear out and must be replaced after repeated sharpening and/or contouring.

Other materials used for ice skate blades are light weight, but have their setbacks. For example, ceramics are known to have a high hardness and light weight. However, these materials have a fracture toughness too low, to justify the replacement of hardened steel.

Although steel is the most widely used for ice skate blades, it constitutes one of the heavier components of an ice skate. Thus, the means to reduce the overall weight of an ice skate have focused on decreasing the weight of the ice skate blade itself. One of such means involved providing a plurality of apertures in the ice skate blade.

Another means to reduce the weight of an ice skate blade consists in applying a relatively thin strip of special steel in the contact zone with the ice. Because the steel strip on such ice skate blade is relatively thin, the ice skate blade cannot be sharpened or contoured.

As can be seen from the previous analysis, the predominant trend in ice skate blades design can be characterized by the use of a) hardened steel and b) apertures for weight reduction.

The following disclosures relate to various types of ice skates and/or ice skate blades thereof: Nicoletti et al. (U.S. Pat. No. 6,485,033, issued Nov. 26, 2002); Pawlowski et al. (U.S. Pat. No. 6,039,328, issued Mar. 21, 2000); Sakcriska (U.S. Pat. No. 5,897,428, issued Apr. 27, 1999; and Allinger et al. (Canadian Patent No. 2,306,167, issued Sep. 2, 2003).

The inventor believes that the cited disclosures taken alone or in combination neither anticipate, nor render obvious the present invention. The foregoing citation does not constitute an admission that such disclosures are relevant or material to the claimed subject matter. Rather, the disclosures relate only to the field of invention and are cited as constituting the closest art of which the inventors are aware.

II. SUMMARY OF THE INVENTION

Without question, the field of ice skates and ice skate blades is very active and the need for improvements is very present.

In the light of the foregoing, one objective of the present invention is to develop an ice skate using an ice skate blade with an extended service life.

Another objective of the present invention is to develop a simple ice skate combined with a simple ice skate blade, easy to service and involving a reduced cost of manufacture.

Yet another objective of the present invention is to provide an ice skate and ice skate blade that satisfy the basic demands of technical aesthetics.

Broadly stating, the ice skate constructed in accordance with the present invention comprises an ice skate blade holder; and an ice skate blade removably secured in a longitudinal recess of the ice skate blade holder.

Front and back end portions of the ice skate blade holder are curved adjacent to the extremities of the longitudinal recess as to protect, during the use of the ice skate, the ends of the latter. The longitudinal recess is also provided with two sides designed to be in contact with two opposed side surfaces of the ice skate blade. Each one of the two sides incorporates at least two longitudinally spaced apart, transversal openings, so disposed in each one of the two sides as to be coaxial.

The ice skate blade has an ice contacting lower curvature and an ice contacting upper curvature so as to be positionally changeable in one of two alternative working positions with respect to the ice skate blade holder, wherein the ice skate blade is firmly, but removably attached; and substantially parallel, opposed side surfaces intersected by at least two longitudinally spaced apart apertures coinciding with at least two longitudinally spaced apart, transversal openings.

Use is made of restraining means inserted through at least two longitudinally spaced apart apertures and at least two longitudinally spaced apart, transversal openings, so as secure together the ice skate blade holder and the ice skate blade.

Broadly stating, ice skate blade in accordance with the present invention is adapted to be used with an ice skate blade holder provided with a longitudinal recess, wherein the ice skate blade is removably secured. The longitudinal recess has two sides designed to be in contact with the ice skate blade. Each one of the two opposed sides incorporate at least two longitudinally spaced apart, transversal openings, so disposed in each one of the two opposed sides as to be coaxial.

The ice skate blade includes an ice contacting lower curvature and an ice contacting upper curvature so as to be positionally changeable in one of two alternative working positions with respect to the ice skate blade holder, wherein the ice skate blade is firmly, but removably attached; and substantially parallel, opposed side surfaces intersected by at least two longitudinally spaced apart apertures coinciding with the at least two longitudinally spaced apart, transversal openings.

More specifically, an ice skate in accordance with the present invention, comprises an ice skate blade holder; and an ice skate blade removably secured in a longitudinal recess of the ice skate blade holder.

The front and back end portions of the ice skate blade holder are curved adjacent to the extremities of the longitudinal recess as to protect, during the use of the ice skate, the ends of the ice skate blade. The longitudinal recess is also provided with two sides designed to be in contact with two opposed side surfaces of the ice skate blade, each one of the two sides incorporating at least two longitudinally spaced apart, transversal openings, so disposed in each one of the two sides as to be coaxial.

The ice skate blade is defined geometrically by a longitudinal axis of symmetry, intersected by a transversal axis of symmetry in the center of symmetry of the ice skate blade, the latter being provided with a lower curvature, symmetrically identical to an upper curvature.

The ice skate blade has a first front-to-rear extending edge, forming an ice-contacting edge, and a second front-to-rear extending edge, spaced and substantially parallel to first front-to rear extending edge. The lower and upper curvatures have each a bow-shape, so that ice skate blade configuration can be considered as similar to an ellipse with elongated ends.

The ice skate blade has also substantially parallel, opposed side surfaces intersected by at least two longitudinally spaced apart apertures that are so disposed to coincide with the at least two longitudinally spaced apart, transversal openings of the longitudinal recess. Use is made of restraining means inserted through at least two longitudinally spaced apart apertures and at least two longitudinally spaced apart, transversal openings, so as secure together the ice skate blade holder and the ice skate blade.

Also more specifically, in accordance with one aspect of the present invention, an ice skate blade is adapted to be used with an ice skate blade holder provided with a longitudinal recess, wherein the ice skate blade is removably secured. The longitudinal recess has two sides designed to be in contact with the ice skate blade. Each one of the two opposed sides incorporate at least two longitudinally spaced apart, transversal openings, so disposed in each one of the two opposed sides as to be coaxial.

The ice skate blade is defined geometrically by a longitudinal axis of symmetry, intersected by a transversal axis of symmetry in the center of symmetry of the ice skate blade, the latter being provided with a lower curvature, symmetrically identical to an upper curvature.

The ice skate blade has a first front-to-rear extending edge, forming an ice-contacting edge, and a second front-to-rear extending edge, spaced and substantially parallel to the first front-to rear extending edge. The lower and upper curvatures have each a bow-shape, so that ice skate blade configuration can be considered as similar to an ellipse with elongated ends. The ice skate blade has also substantially parallel, opposed side surfaces intersected by at least two longitudinally spaced apart apertures that are so disposed to coincide with at least two longitudinally spaced apart, transversal openings of the longitudinal recess.

III. BRIEF DESCRIPTION OF THE DRAWINGS

Although the characteristic features of the invention will be particularly pointed out in the claims, the invention itself and the manner in which it may be made and used may be better understood by referring to the following description and accompanying drawings. Like reference numerals refer to like parts throughout the several views of the drawings in which:

IV. DESCRIPTION OF THE PREFERRED EMBODIMENTS

Figure 1:
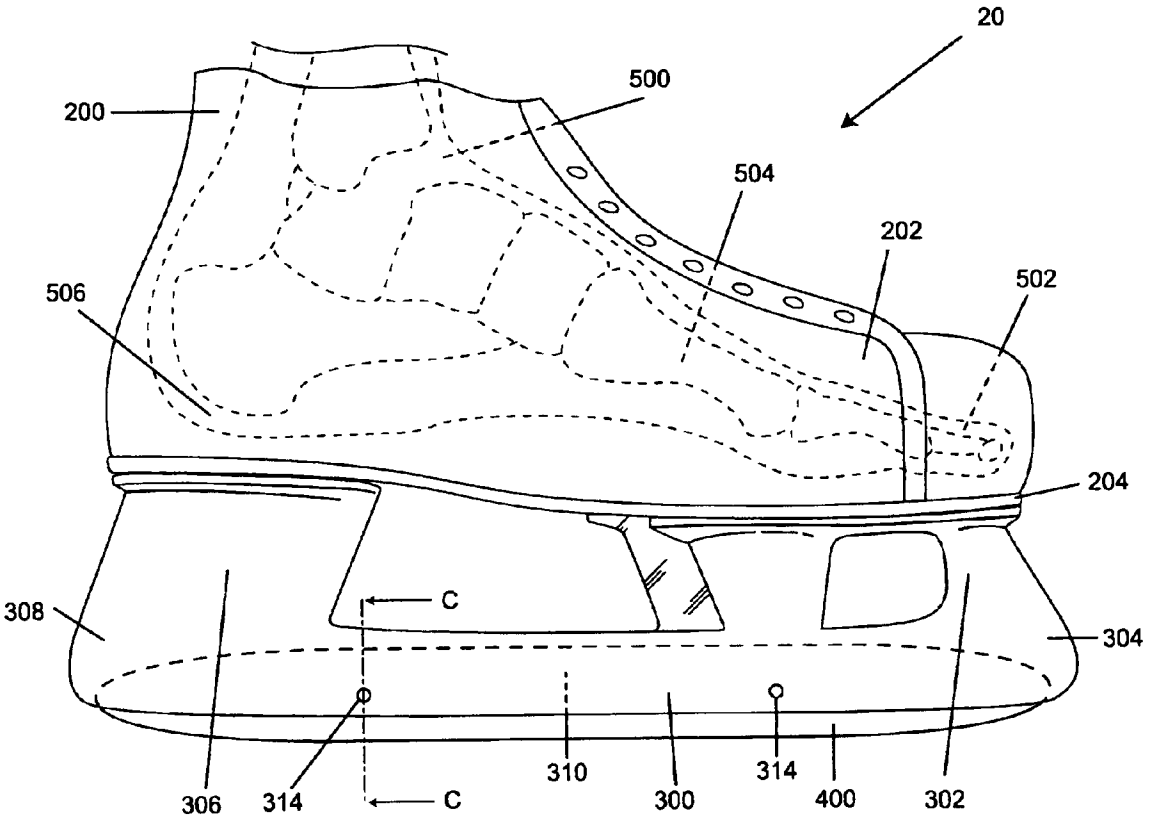
FIG. 1 illustrates a side elevational view of the ice skate constructed in accordance with the present invention.
Figure 5:
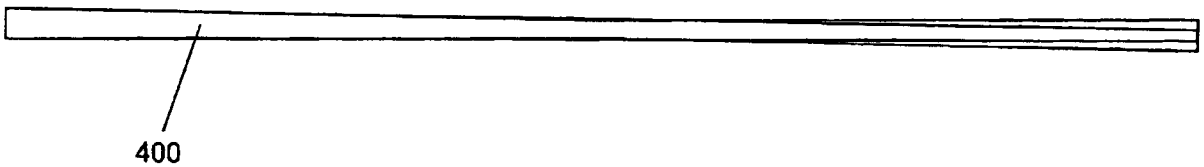
FIG. 5 illustrates a top view of the ice skate blade as shown in FIG. 2.
Figure 2:
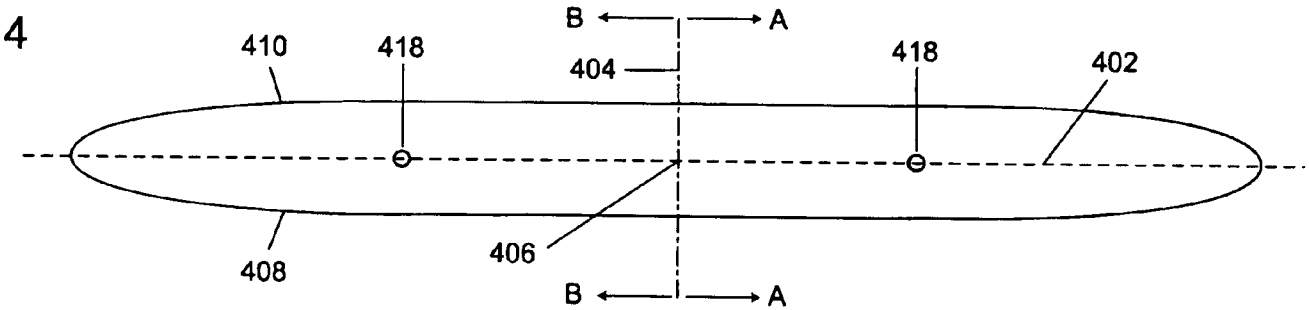
FIG. 2 illustrates a side elevational view of one embodiment of ice skate blade as shown in FIG. 1.
Figure 3:
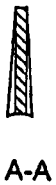
FIG. 3 illustrates a sectional view taken along line A-A of FIG. 2.
Figure 4:
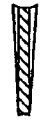
FIG. 4 illustrates a sectional view taken along line B-B of FIG. 2.
Figure 6:
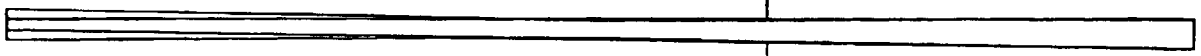
FIG. 6 illustrates a bottom view of the ice skate blade as shown in FIG. 2.
Figure 7:
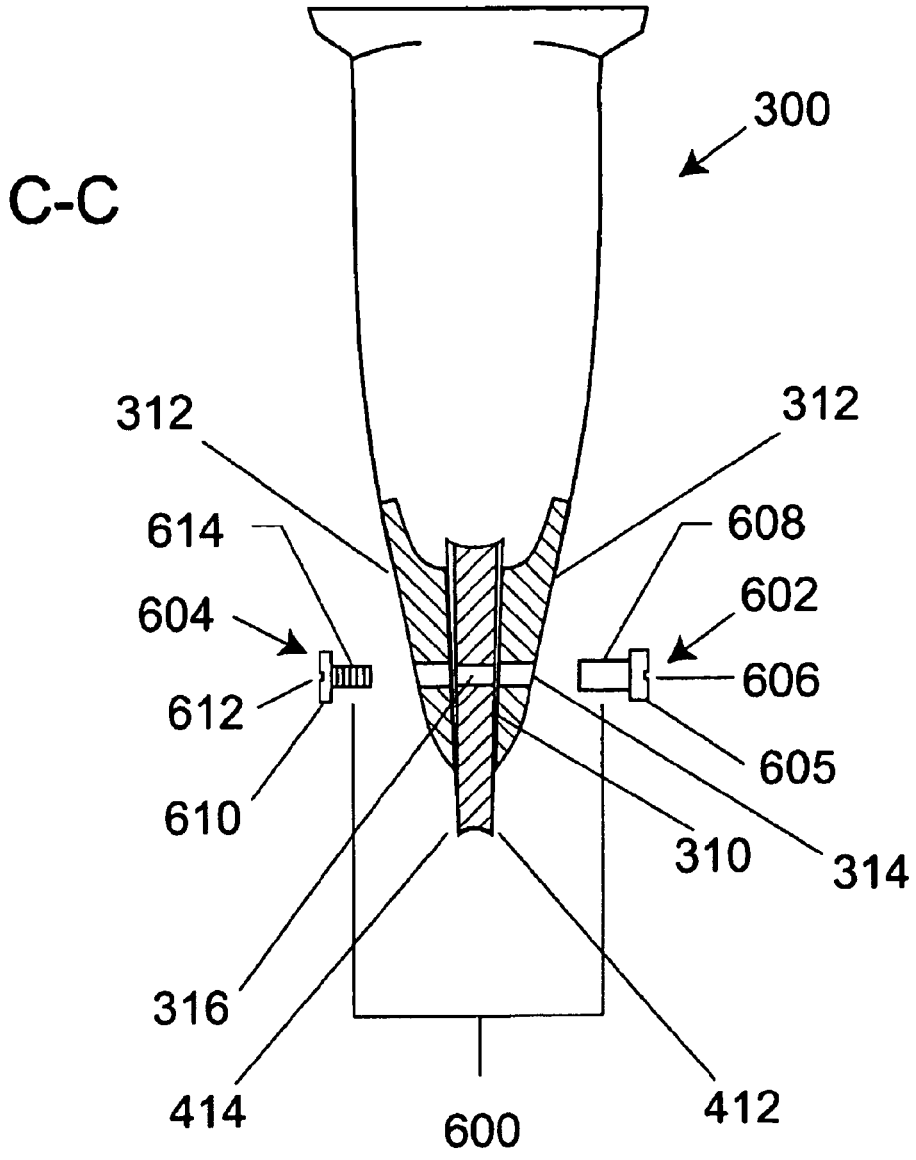
FIG. 7 illustrates an enlarged transverse cross-sectional view taken substantially along line C-C of FIG. 1.

FIGS. 1-7 illustrate an ice skate comprising an ice skate 20 comprising an ice skate boot 200, an ice skate blade holder 300 and an ice skate blade 400. Ice skate boot 200 comprises an upper 202, an outsole 204, the latter being secured to ice skate blade holder 300.

Describing now in detail, ice skate blade holder 300 is formed from metal or molded plastic and incorporates a front member 302, provided with a front end portion 304 and a back member 306, provided with a back end portion 308. Front member 302 incorporates a front pedestal and back member 306 incorporates a rear pedestal. A skater's foot 500, with particular reference to FIG. 1, is shown inserted into ice skate boot 200 and is positioned on ice skate holder 300 as follows: front pedestal of front member 302 underlies a toe region 502 and a forward metatarsal region 504 of skater's foot 500; rear pedestal of back member 306 underlies a heel 506 of skater's foot 500 that overlies outsole 204. The attachment of outsole 204 to ice skate blade holder 300 is achieved via restraining features 600 (see FIG. 7). Alternatively, ice skate blade holder 300 could be formed by integrally molding with ice skate boot 200.

Ice skate blade holder 300 includes a longitudinal recess 310 to house and hold ice skate blade 400. The latter is removably secured in longitudinal recess 310.

Front and back end portions 304 and 308 of ice skate blade holder 300 are curved at its front and back end portions adjacent to the extremities of longitudinal recess 310 as to protect, during the use of ice skate 20, the ends of ice skate blade 400, when the latter is already snugly inserted into longitudinal recess 310. The latter is also provided with two sides 312, designed to be in contact with two opposed sides of ice skate blade 400. Each one of two sides 312 is provided with at least two longitudinally spaced apart, transversal openings 314. The latter are so provided in each one of two sides 312 as to be coaxial.

Ice skate blade 400 is defined geometrically by a longitudinal axis of symmetry 402, intersected by a transversal axis of symmetry 404 in the center of symmetry 406 of that ice skate blade 400. Ice skate blade 400 has, in a first embodiment, a lower curvature 408, symmetrically identical to an upper curvature 410 of that ice skate blade 400.

Ice skate blade 400 has a first front-to-rear extending edge 412, forming an ice-contacting edge, and a second front-to-rear extending edge 414 spaced and substantially parallel to first front-to rear extending edge 412.

Lower and upper curvatures 408 and 410, each have a bow-shape, so that ice skate blade 400 configuration can be considered as similar to an ellipse with elongated ends.

Ice skate blade 400 has substantially parallel, opposed side surfaces 416 intersected by two longitudinally spaced apart apertures 418. The latter are so disposed to coincide with at least two longitudinally spaced apart, transversal openings 314 of longitudinal recess 310.

It will be appreciated, that by virtue of the provision of a single row of the above openings and apertures (314 and 418), through which restraining features 600 are accessible transversally, from outside ice skate blade holder 300, the securing, or alternatively, the removal of ice skate blade 400 can be effected without the need to remove boot 200 and without the need to have access to the inside of boot 200.

In the first embodiment of the present invention, in order to reduce the resistance during ice sliding, ice skate blade 400, viewed in an operative position, has a greater width, in comparison with its overall thickness, at both anterior lower end and posterior upper end, so that by rotating ice skate blade 400 at 180° around center of symmetry 406, (during a repositioning of ice skate blade 400) the anterior lower end will be wider (wedge-type shaped end defined by substantially parallel, opposed side surfaces 416). Thus, always a choice can be made between two working positions, the same ice skate blade 400 being able to be repositioned with respect to longitudinal recess 310, without having to replace the whole blade with a new one. Since posterior upper end of ice skate blade 400, which is wider, is, in the operative position of the latter, always inserted into longitudinal recess 310, the latter must be adapted to accommodate that wedge-type shaped end. The degree of flexibility of the material used for ice skate blade holder 300, longitudinal recess 310 being an integral part of it, and/or a corresponding shape and size of longitudinal recess 310 should be considered when designing longitudinal recess 310. Since the selection of materials an ice skate 20 is well known to those skilled in the art, further detailed discussion of this aspect is not deemed necessary.

In the case where a constant thickness of ice skate blade 400 is chosen, the latter can be used in any one of two working positions, only by rotating at 180° around its longitudinal axis of symmetry 402.

Besides the foregoing embodiment, other embodiments based on the same inventive concept can be envisaged. Thus, any ice skate blades having:

an ice contacting lower curvature and an ice contacting upper curvature of identical or different configuration;

constant or variable thickness; and any other characteristics, as long as they are adaptable to be positionally interchanged in any one of the two alternative working positions with respect to the ice skate blade holder, and firmly, but removably attached to the latter, should be considered as emanating from the same inventive concept. Thus, those ice skate blades will provide an enhanced service life and/or versatility.

Each restraining feature 600 comprises a female and male screw 602 and 604, respectively. Female screw 602 includes a hexagon head 605 with a slot 606 for a screw driver, continued by an internally threaded hollow bar 608. The length of the latter is less than a distance between external surfaces of two sides 312 of longitudinal recess 310. Male screw 604 includes also a hexagon head 610 with a slot 612 for a screw driver, continued by an externally threaded solid bar 614. The latter is commensurate to fit into internally threaded hollow bar 608 of female screw 602.

Each female screw 602 of each restraining feature 600 is inserted transversally with a light fit press into opposed openings 314; first into one opening 314, then, throughout one aperture 418, into an opposed openings 314 and finally tightened with a male screw 604. The force generated in each restraining feature 600, as a result of the rotating male screw 604, while female screw 602 is kept immobilized, or vice versa, is such as to bring about a corresponding securing pressure between the mutual contacting surfaces of sides 312 and of substantially parallel, opposed side surfaces 416 of ice skate blade 400. To prevent, during use, a relative turning between female and male screw 602 and 604, already tightened, an adhesive sealant is used. For example, LOCTITE® produces thread-lockers materials such as 242 and 243 (both characterized by removable strength) that can be introduced into internally threaded hollow bar 608 and/or spread on externally threaded solid bar 614.

It is obvious that other mechanical restraining means could be used for firmly but removably attaching ice skate blade 400 in longitudinal recess 310 of ice skate blade holder 300.

As required, a detailed embodiment of the present invention is disclosed herein; however, it is to be understood that the disclosed embodiment is merely exemplary of the invention which may be embodied in various forms. Therefore, specific structural and functional details disclosed herein are not to be interpreted as limiting, but merely as a basis for the claims and as representative basis for teaching one skilled in the art to variously employ the present invention in virtually any appropriately detailed structure.

The invention claimed is:

1. An ice skate comprising an ice skate blade holder; and an ice skate blade removably secured in a longitudinal recess of said ice skate blade holder, a front and a back end portions of said ice skate blade holder being curved adjacent to the extremities of said longitudinal recess as to protect, during a use of said ice skate, both ends of said ice skate blade, said longitudinal recess being also provided with two sides, designed to be in contact with two opposed side surfaces of said ice skate blade, each one of said two sides incorporating at least two longitudinally spaced apart, transversal openings, so disposed in each one of said two sides as to be coaxial;

said ice skate blade having an ice contacting lower curvature and an ice contacting upper curvature so as to be positionally changeable in one of two alternative working positions with respect to said ice skate blade holder, wherein said ice skate blade is secured; and said two opposed side surfaces are penetrated by at least two longitudinally spaced apart apertures coinciding with said at least two longitudinally spaced apart, transversal openings; and restraining means inserted through said at least two longitudinally spaced apart apertures and said at least two longitudinally spaced apart, transversal openings, so as secure together said ice skate blade holder and said ice skate blade.

2. An ice skate blade adapted to be used with an ice skate blade holder provided with a longitudinal recess, wherein said ice skate blade is removably secured, said longitudinal recess having two sides designed to be in contact with two opposed side surfaces of said ice skate blade, each one of said two sides incorporating at least two longitudinally spaced apart, transversal openings, so disposed in each one of said two sides as to be coaxial;

said ice skate blade comprising an ice contacting lower curvature and an ice contacting upper curvature so as to be positionally changeable in one of two alternative working positions with respect to said ice skate blade holder; and a pair of parallel, opposed side surfaces transversally penetrated by at least two longitudinally spaced apart apertures coinciding with said at least two longitudinally spaced apart, transversal openings.

3. An ice skate comprising an ice skate blade holder; and an ice skate blade removably secured in a longitudinal recess of said ice skate blade holder, a front and a back end portions of said ice skate blade holder being curved adjacent to the extremities of said longitudinal recess as to protect, during the use of said ice skate, both of said ice skate blade, said longitudinal recess being also provided with two sides designed to be in contact with two opposed side surfaces of said ice skate blade, each one of said two sides incorporating at least two longitudinally spaced apart, transversal openings, so disposed in each one of said two sides as to be coaxial;

said ice skate blade being defined geometrically by a longitudinal axis of symmetry, intersected centrally by a transversal axis of symmetry, said ice skate blade being provided with a lower curvature, symmetrical to and identical with an upper curvature;

said ice skate blade being also provided with a first front-to-rear extending edge forming an ice-contacting edge, and a second front-to-rear extending edge/also forming an ice-contacting edge/, spaced and substantially parallel to said first front-to-rear extending edge, said lower and upper curvatures having each a bow-shape, so said ice skate blade's configuration is similar to an ellipse with elongated ends;

said ice skate blade having also substantially parallel, opposed side surfaces transversally penetrated by at least two longitudinally spaced apart apertures disposed to coincide with at least two longitudinally spaced apart, transversal openings of said longitudinal recess; and restraining means inserted through said at least two longitudinally spaced apart apertures and said at least two longitudinally spaced apart, transversal openings, so as secure together said ice skate blade holder and said ice skate blade.

4. An ice skate blade adapted to be used with an ice skate blade holder including a longitudinal recess wherein said ice skate blade is removably secured, said longitudinal recess having two sides designed to be in contact with said ice skate blade, each one of said two opposed sides incorporating at least two longitudinally spaced apart transversal openings, so disposed in each one of said two opposed sides as to be coaxial, said ice skate blade being defined geometrically by a longitudinal axis of symmetry, intersected centrally by a transversal axis of symmetry, said ice skate blade being provided with a lower curvature, symmetrical to and identical with an upper curvature;

said ice skate blade having a first front-to-rear extending edge, forming an ice-contacting edge, and a second front-to-rear extending edge/forming also an ice-contacting edge/, spaced and substantially parallel to said first front-to rear extending edge, said lower and upper curvatures having each a bow-shape, so said ice skate blade's configuration is similar to an ellipse with elongated ends; and said ice skate blade having also substantially parallel, opposed side surfaces transversally penetrated by at least two longitudinally spaced apart apertures disposed to coincide with at least two longitudinally spaced apart transversal openings of said longitudinal recess.

* * * * *